| United States Patent [19] | [11] Patent Number: 4,683,287 |
| Koleske et al. | [45] Date of Patent: Jul. 28, 1987 |

[54] COMPOSITIONS CONTAINING A REACTIVE MONOMER DERIVED FROM A LACTONE

[75] Inventors: Joseph V. Koleske, Charleston, W. Va.; Linda A. Domeier, Somerville, N.J.

[73] Assignee: Union Carbide Corporation, Danbury, Conn.

[21] Appl. No.: 895,594

[22] Filed: Aug. 14, 1986

Related U.S. Application Data

[63] Continuation of Ser. No. 755,532, Jul. 16, 1985, abandoned, which is a continuation of Ser. No. 565,530, Dec. 29, 1983, abandoned, which is a continuation of Ser. No. 438,496, Nov. 2, 1982, abandoned.

[51] Int. Cl.$^4$ ............................................. C08G 63/10
[52] U.S. Cl. .................................... 528/357; 528/354; 528/355; 560/183
[58] Field of Search ............... 528/354, 355, 357, 361; 560/183

[56] References Cited

U.S. PATENT DOCUMENTS

| 3,655,631 | 4/1972 | Fraser et al. ...................... 528/355 X |
| 4,188,472 | 2/1980 | Chang .............................. 525/440 X |
| 4,328,325 | 5/1982 | Marquardt et al. . |
| 4,368,320 | 1/1983 | Aldinger et al. ................ 528/354 X |

FOREIGN PATENT DOCUMENTS 2101121 1/1983 United Kingdom .
2118197 10/1983 United Kingdom .

*Primary Examiner*—Earl Nielsen
*Attorney, Agent, or Firm*—J. B. Mauro

[57] ABSTRACT

Described herein are compositions containing a reactive monomer derived from the reaction product of a hydroxyalkyl acrylate or methacrylate and a lactone. These compositions can be reacted with other ethlenically unsaturated monomers to produce curable oligomers and polymers than can be made into high quality industrial finishes by incorporation of various conventional crosslinking agents, plus other normally used formulating ingredients.

19 Claims, No Drawings

COMPOSITIONS CONTAINING A REACTIVE MONOMER DERIVED FROM A LACTONE

This application is a continuation of prior U.S. application Ser. No. 755,532, filed 7/16/85, which is a continuation of application Ser. No. 565,530, filed 12/29/83, which is a continuation of application Ser. No. 438,496, filed 11/2/82, all now abandoned.

BACKGROUND OF THE INVENTION

Described herein are compositions containing a reactive monomer derived from the reaction product of a hydroxyalkyl acrylate or methacrylate and a lactone. These compositions can be reacted with other ethylenically unsaturated monomers to produce curable oligomers and polymers that can be made into high quality industrial finishes by incorporation of various conventional cross-linking agents, plus other normally used formulating ingredients.

Reaction products of caprolactone with hydroxyethyl acrylate and methacrylate are described in the literature. For example, U.S. Pat. No. 3,655,631 describes, as in Example 1 thereof, the polymerization of epsilon-caprolactone with hydroxyethyl acrylate, as initiator, in the presence of 0.1% by weight of p-toluene sulphonic acid as catalyst, the reaction being carried out at a temperature of 45° C. for 4 hours. The catalyst is described as an organic acid catalyst selected from the group consisting of halogen substituted aliphatic carboxylic acids other than trichloroacetic acid, alkane sulphonic acids, benzene sulphonic acid and lower alkyl substituted benzene sulphonic acids. The product is described in said Example I as a solid unsaturated polyester having a molecular weight of about 960. Example 8 of said patent describes the polymerization of hydroxyethyl methacrylate and epsilon-caprolactone using 0.1% by weight of p-toluene sulphonic acid catalyst. The polyester product is described as having a molecular weight of 437 and being a viscous liquid. In Examples 1 and 8 the polymerization is stated to be complete.

The polyesters produced in said patent have relatively large amounts of residual acid catalyst present (i.e., about 1000 parts per million). The presence of such strong acid catalyst in the polyester product could lead to degradation of the product. Also, its presence may decrease the shelf life and pot life of coating systems produced from oligomers containing the polyester product and certain cross-linking agents. Also, the use of a polyester product containing such strong residual acids may generate highly colored by-products that may be detrimental in some coating applications.

U.S. Pat. No. 4,188,472 describes reacting (a) a lactone with an ester-containing acrylyl or alpha-substituted acrylyl group and one or two hydroxyl groups, and (b) reacting the product of (a) with an isocyanate. Specifically, in Examples I to III, hydroxyethyl acrylate is added to epsilon caprolactone which was heated to 130° C. (Example I) or 120° C. (Examples II and III). Large amounts of a catalyst such as TPT titanate (greater than 2000 parts per million, Example I) or a mixture of stannous octanoate and dibutyltin dilurate (greater than 1500 parts per million, Examples II and III) were added to the reaction mixture. Additionally, the reaction carried out in these Examples utilizes large amounts of inhibitor, i.e., greater than 5000 parts per million. The reaction is carried out at temperatures of 130° C. for 6 hours (Example I) and 120° C. for 8 hours (Examples II and III). The product of the reaction in these Examples is described as having a hydroxyl value of 162 (Example I), 318 (Example II) and 122 (Example III). In Example II the reaction is stated to be complete.

The use of the large amounts of catalyst and inhibitor in the polymerization described in U.S. Pat. No. 4,188,472 can have deleterious effects on the subsequent use of the lactone modified resin in polymerization or copolymerization reactions and/or cross-linking reactions.

European patent application No. 0044 393A2 titled "Process For Production of A (Meth)Acrylate Resin With Hydroxyl Groups and Modified By Epsilon-Caprolactone" describes the reaction of at least one monoester of acrylic or methacrylic acid with an alkane diol with 2-4 carbon atoms in the molar ratio of 1.5:1 to 1:3 with epsilon-caprolactone. The reaction is described as occuring at a temperature of 60°-130° C. in the presence of an oganotin compound. Specifically, in Example I, an adduct from 2-hydroxyethyl acrylate and epsilon-caprolactone is prepared. 2-Hydroxyethyl acrylate and dibutyltin oxide are heated to 120° C. and epsilon-caprolactone is added over the course of two hours. This mixture is heated for two more hours at 120° C. This Example was repeated and the reaction product was shown to contain greater than 25 weight percent of unreacted 2-hydroxyethyl acrylate.

THE INVENTION

This invention is directed to a composition comprising:
(a) 0 to 10 weight percent, preferably 0 to 5 weight percent of a lactone,
(b) greater than 0 to about 20 weight percent, preferably less than 10 weight percent of hydroxyalkyl acrylate or methacrylate,
(c) 2 or less weight percent, preferably 1 or less weight percent of diacrylates,
(d) 10 or less weight percent, preferably 5 or less weight percent of products resulting from Michael addition, acrylic polymerization, transesterification reactions, or other side reactions,
(e) remainder to 100 weight percent of a reactive monomer of the following formula:

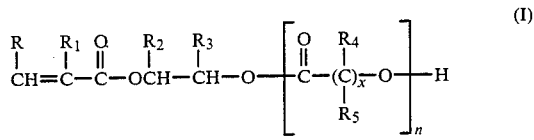

wherein R, $R_1$, $R_2$, and $R_3$ are independently hydrogen or methyl, $R_4$ and $R_5$ are independently hydrogen or alkyl or from 1 to 12 carbon atoms, x is from 4 to 7, and the average value of n in the composition is equal to or greater than 1, and
(f) less than about 200 parts per million, preferably less than about 100 parts per million of catalyst based on the total weight of the composition.

It has been found that the composition of this invention can be used as a comonomer in polymerization reactions with other monomers. When polymerized with comonomers such as acrylic, vinyl or similar monomers the composition of this invention yields oligomers and/or copolymers, which when cross-linked, yield coatings or adhesives, having high flexibility, impact resistance, solvent resistance, hydrolytic stability, and chemical compatibility. The compositions of this invention can also be homopolymerized to yield oligomers or homopolymers having similar desirable properties.

The composition of this invention is prepared by reacting a lactone with a hydroxyalkyl acrylate or methacrylate. The lactone is characterized by the following formula:

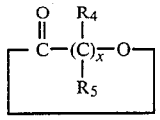

wherein $R_4$ and $R_5$ are hydrogen or alkyl of from 1 to 12 carbon atoms, and x is from 4 to 7. The preferred lactone is epsilon-caprolactone.

The hydroxyalkyl acrylates or methacrylates include 2-hydroxyethyl acrylate, hydroxypropyl acrylate, hydroxybutyl acrylate, 2-hydroxyethyl methacrylate, 2-hydroxypropyl methacrylate, 2-hydroxy-3-chloropropyl methacrylate, 2-hydroxy-3-chloro-propyl acrylate, 2,3-dihydroxy propyl methacrylate, 2,3-dihydroxy propyl acrylate, and the like, or mixtures thereof. Hydroxyethyl acrylate or methacrylate is preferred.

The compositions of this invention are prepared by reacting the lactone with the hydroxyalkyl acrylate or methacrylate in the presence of less than about 200 parts per million, preferably less than 100 parts per million, of a catalyst, based on the combined weight of lactone and hydroxyalkyl acrylate or methacrylate. The catalyst which may be used herein includes one or more organometallic compounds and other metallic compounds such as stannic chloride or ferric chloride and other Lewis and protonic acids. Preferred catalysts include stannous octonoate, dibutyltin dilaurate, and other tin compounds; titanates such as tetraisopropyl titanate and butyl titanate; and the like.

The reaction is carried out at a temperature of from about 100° to about 140° C., preferably from about 120° to about 130° C. The reaction may be carried out at atmospheric pressure, although higher or lower pressures may be used. The reaction is generally carried out in the presence of oxygen to inhibit polymerization of the hydroxyalkyl acrylate or methacrylate. The reaction is carried out for a period of from about 2 to about 20, preferably from about 3 to about 11 hours.

The reaction is carried out in the presence of a suitable inhibitor to prevent polymerization of the hydroxyalkyl acrylate or methacrylate double bond. The inhibitors include the monomethyl ether of hydroquinone, benzoquinone, phenothiazine, methylhydroquinone, 2,5-di-t-butylquinone, hydroquinone, and other common free radical inhibitors known in the art. The level of inhibitor used is less than 1000 parts per million, preferably less than 800 parts per million, and most preferably, less than 600 part per million.

In a preferred embodiment, the process of this invention is carried out by adding the lactone to a reaction vessel and heating this to reaction temperature (about 100° C. to about 140° C.) while sparging the lactone with an inert gas such as nitrogen. The lactone may be dried with for example conventional agents such as molecular seives before adding it to the reaction vessel. When the reaction temperature is achieved or soon thereafter, the inert gas sparge is changed to a mixture of inert gas and oxygen (such as air). Various alternatives may be used. For example, the system may be sparged with the inert gas and oxygen mixture for a short period of time i.e., about 5 to 10 minutes, after which the sparge is discontinued, and the gas mixture then used only to flush the reactor vapor space throughout the reaction; or the inert gas sparge is stopped and the system is flushed with the mixture throughout the reaction; or the gas mixture may be sparged through the system while an inert gas is additionally used to flush the vapor space during the reaction period. Combinations of these alternatives may be used if desired.

The hydroxyalkyl acrylate or methacrylate may be mixed with the catalyst and inhibitor and this mixture added to the heated lactone. Alternatively, the inhibitor may be added to the lactone prior to heating. Also the lactone may be added to the hydroxyalkyl acrylate or methacrylate which has been heated, or all the reactants may be added initially to the reactor and the process carried out. Several variations in the mode of addition of the lactone, acrylate or methacrylate, catalyst and inhibitor may be used. The final reaction mixture is maintained at the reaction temperature for about 2 to about 20 hours.

The reaction mixture is collected and may be used without purification. If desired the reaction mixture may be purified by conventional techniques such as vacuum stripping.

The process may also be carried out in the presence of a suitable solvent which does not contain, for example, active hydrogens or polymerizable ethylenically unsaturated groups. These solvents include ketones, ester, ethers, aromatic and aliphatic hydrocarbons, and the like, or mixtures thereof. Preferred solvents include esters, such as Cellosolve acetate.

Preferably, epsilon-caprolactone is reacted with hydroxyethyl acrylate or methacrylate according to the process described herein in the ratio of one mole of the acrylate or methacrylate to from one to 12 moles of the lactone. These compositions may be solid or liquid, and the most preferred compositions are liquid.

The most preferred compositions are produced by reacting epsilon-caprolactone with hydroxyethyl acrylate or methacrylate in a ratio of one mole of the hydroxyethyl acrylate or methacrylate to two or three moles of the epsilon-caprolactone. These compositions contain the reactive monomers of formula (I), 0 to 5 weight percent of lactone, less than 10 weight percent of hydroxyethyl acrylate or methacrylate, minor amounts of additional reaction product, 400 to 600 parts per million of inhibitor, and catalyst residues in amounts of about 50 parts per million.

EXAMPLES

The following examples serve to illustrate specific embodiments of this invention and it is not intended that the invention shall be limited by the examples.

EXAMPLE I

A 500 ml glass reaction flask was equipped with a stirrer, thermometer, condenser, and nitrogen inlet and outlet tubes and used as the reaction vessel. Epsilon-caprolactone was dried by contacting it with molecular sieves for about 30 minutes. Then, 228 grams of the dried epsilon-caprolactone were introduced into the reaction vessel and heated to 140° C. while sparging the system with nitrogen. When the temperature reached 140° C., the nitrogen sparge was changed to an air sparge and a mixture of 116 grams of 2-hydroxyethyl acrylate, 0.0366 grams (106 ppm) of stannous octanoate and 0.027 grams (78 ppm) of the monomethyl ether of hydroquinone was added over a ten minute period. The reaction mixture was held at 140° C. for six hours, cooled to room temperature (about 25° C.), and collected as a residue product. The product had a hydroxyl number of 148.7, an acid number of 3.41, and a Brookfield viscosity of 98 centipoise (at 25° C.).

EXAMPLE II

A 5 liter glass reaction flask sparged as described in Example I was used as the reaction vessel. A charge of 2,736 grams of epsilon-caprolactone was introduced into the reaction vessel and heated to 140° C. while sparging with nitrogen. When the temperature reached 140° C., the nitrogen sparge was changed to an air sparge which was used for about 5 minutes and then changed to a flush of air which was continued during the reaction period. Then a mixture of 1,392 grams of 2-hydroxyethyl acrylate, 0.208 grams (50 ppm) of stannous octanoate, and 1.30 grams (315 ppm) of the monomethyl ether of hydroquinone was added over a 25 minute period. The reaction mixture was held at 140° C. for five hours, cooled to room temperature (about 25° C.), and collected as a residue product. The residue product had a hydroxyl number of 159, an acid number of 3.29, and a Brookfield viscosity of 115 centipose (at 25.5° C.). Carbon-13 nuclear magnetic resonnance studies indicated the final product contained 7.8% by weight 2-hydroxyethyl acrylate, an average value of n in formula I of 2.8 and nil epsilon-caprolactone.

EXAMPLE III

A 500 ml glass reaction flask equipped as described in Example I was used as the reaction vessel. A charge of 456 grams of epsilon-caprolactone was introduced into the reaction vessel and heated to 140° C. while sparging with nitrogen. When the temperature reached 140° C. the nitrogen sparge was changed to an air sparge, and a mixture of 260 grams of 2-hydroxyethyl methacrylate, 0.036 grams (50 ppm) of stannous octanoate, and 0.217 grams (303 ppm) of the monomethyl ether of hydroquinone was added over a 5 to 6 minute time period. The reaction mixture was held at 140° C. for six hours, cooled to room temperature (about 25° C.) and stored as a residue product. The product had a hydroxyl number of 141.7.

EXAMPLE IV-VIII

A suitable glass reaction vessel similar to that described in Example I was used. The ingredients used are described in Table I.

TABLE I

|  | EXAMPLE | | | | |
|---|---|---|---|---|---|
|  | IV | V | VI | VII | VIII |
| ε-caprolactone, gm | 2,046 | 684 | 912 | 3,529 | 3747 |
| 2-hydroxyethyl acrylate, gm | 2,082 | 232 | 232 | 599 | 381 |
| Stannous Octanoate |  |  |  |  |  |
| grams | 0.208 | 0.052 | 0.073 | 0.208 | 0.208 |
| ppm | 50 | 57 | 64 | 50 | 50 |
| Monomethyl ether of Hydroquinone |  |  |  |  |  |
| grams | 1.30 | 0.325 | 0.325 | 1.30 | 1.30 |
| ppm | 315 | 355 | 284 | 315 | 315 |

The epsilon-caprolactone was introduced into the reaction vessel and heated to 140° C. while sparging with nitrogen. When the temperature reached 140° C., the nitrogen sparge was changed to an air sparge and a mixture of the other three ingredients was added to the caprolactone. The time to feed the mixture and time held at the reaction temperature of 140° C. is given in Table II. After the reaction time had elapsed, the product was cooled to room temperature (about 25° C.), and stored as a residue product. The analysis of the residue products is given in Table II.

TABLE II

|  | EXAMPLE | | | | |
|---|---|---|---|---|---|
|  | IV | V | VI | VII | VIII |
| Feed time, min | 20 | 5 | 4 | 5 | 1 |
| Reaction time, hr | 5 | 6 | 6 | 5.5 | 7 |
| Hydroxyl Number | 244.5 | 114.3 | 84.5 | 75.3 | 42.5 |
| Acid Number | 3.69 | 1.85 | 1.31 | 2.44 | 2.47 |
| Viscosity, cps (room temperature) | 151 | 189 | — | — | — |
| Appearance | liquid | slush | solid | solid | solid |

EXAMPLE IX

A 5000 ml glass reaction flask was equipped with a stirrer, a thermometer fitted with a temperature controller, a condenser, and gas sparging tube. A 2052 g. charge of dry (~100 ppm H$_2$O) epsilon-caprolactone and 0.975 g. of the monomethyl ether of hydroquinone was added to the flask. A nitrogen sparge was bubbled below the liquid surface as the material was heated to 130° C. The sparge was switched from nitrogen to air and maintained below the surface for 10 min. and the sparge tube was then raised above the liquid surface and the air space was flushed with air during the remainder of the reaction.

A charge of 1044 g. 2-hydroxyethyl acrylate containing 0.155 g. stannous octanoate was added over 30 min. and the reaction was then maintained at 130° C. for about 10 hours and then allowed to cool to room temperature.

A $^{13}$C NMR analysis showed 7.6 weight percent of 2-hydroxyethyl acrylate, nil ε-caprolactone, and an average value of n in formula I of 2.7. The viscosity of the product was 84 cps.

EXAMPLE X

A 5000 ml glass reaction flask was equipped with a stirrer, a thermometer fitted with a temperature controller, a condenser, and gas sparging tube. A 2052 g. charge of dry (~100 ppm H$_2$O) epsilon-caprolactone and 1.625 g. of the monomethyl ether of hydroquinone was added to the flask. A nitrogen sparge was bubbled below the liquid surface as the material was heated to 130° C. and for 30 min. after reaching 130° C. The sparge below the surface was switched from nitorgen to air and a nitrogen flush of the air space above the liquid surface was begun.

A charge of 1044 g. of 2-hydroxyethyl acrylate containing 0.155 g. stannous octanoate was added in a single batch. The reaction was maintained at 130° C. for 8 hours and then allowed to cool to room temperature.

A liquid chromatographic analysis of the product showed it to be identical to that of Example III.

EXAMPLE XI

A nitrogen flushed 50 gallon, glass-lined reactor was charged with about 242 pounds of dry (~100 ppm H$_2$O) epsilon-caprolactone and 100 g. of the monomethyl ether of hydroquinone. Nitrogen was sparged into the liquid as it was heated to 100° C. over about 1.5 hours. The sparge was then switched to air, and an additional flush of nitrogen was then added to the reactor vapor space during the remainder of the reaction. After sparging with air for 1.5 hours, a charge of 124 pounds of 2-hydroxyethyl acrylate containing 8.8 g. of stannous octanoate was then heated to 125°–130° C. over about 2 hours. The reaction was held at this temperature for about 8.5 hours and then cooled to about 65° C. over 1.5 hours before being discharged.

The product mixture contained 7.7% by weight 2-hydroxyethyl acrylate, less than 4% caprolactone, and about 580 parts per million of the monomethyl ether of hydroquinone. The average value of n in formula I was 2.7 and the product had a viscosity of 84 cps.

What is claimed is:

1. A substantially liquid composition comprising:
   (a) 1 to 10 weight percent of a lactone,
   (b) greater than 1 to about 20 weight percent of hydroxyalkyl acrylate or methacrylate,
   (c) 2 or less weight percent of diacrylates,
   (d) 10 or less weight percent of products resulting from Michael addition, acrylic polymerization, transesterification reactions, or other side reactions,
   (e) remainder to 100 weight percent of a reactive monomer of the following formula:

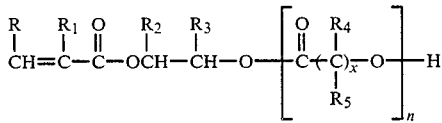

wherein R, $R_1$, $R_2$, and $R_3$ are independently hydrogen or methyl, $R_4$ and $R_5$ are independently hydrogen or alkyl of from 1 to 12 carbon atoms, x is from 4 to 7, and the average value of n in the composition is 1 to 3, and
   (f) less than about 100 parts per million of catalyst, based on the total weight of the composition.

2. A composition as defined in claim 1 wherein component (a) is epsilon-caprolactone.

3. A composition as defined in claims 1 or 2 wherein component (b) is hydroxyethyl acrylate or methacrylate.

4. A composition as defined in claims 1 or 2 wherein in component (e) the average value of n is 2 to 3.

5. A composition as defined in claim 1 which contains an inhibitor to prevent polymerization of the hydroxyalkyl acrylate or methacrylate double bond.

6. A process for preparing the composition of claim 1 which comprises reacting, in an atmosphere that contains oxygen, a lactone and hydroxyalkyl acrylate or methacrylate in the presence of less than about 100 parts per million of a catalyst, based on the combined weight of lactone and hydroxyalkyl acrylate or methacrylate, and less than 1000 parts per million of an inhibitor to prevent polymerization of the hydroxyalkyl acrylate or methacrylate at a temperature of from about 100° to about 140° C.

7. A process as defined in claim 6 wherein the lactone is epsilon-caprolactone.

8. A process as defined in claims 6 or 7 wherein the hydroxyethyl acrylate or methacrylate is hydroxyethyl acrylate or methacrylate.

9. A substantially liquid composition comprising:
   (a) 1 to 10 weight percent of a lactone,
   (b) greater than 1 to about 20 weight percent of hydroxyalkyl acrylate or methacrylate,
   (c) 2 or less weight percent of diacrylates,
   (d) 10 or less weight percent of products resulting from Michael addition, acrylic polymerization, transesterification reactions, or other side reactions,
   (e) remainder to 100 weight percent of a reactive monomer of the following formula:

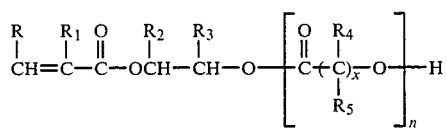

wherein R, $R_1$, $R_2$, and $R_3$ are independently hydrogen or methyl, $R_4$ and $R_5$ are independently hydrogen or alkyl of from 1 to 12 carbon atoms, x is from 4 to 7, and the average value of n in the composition is 1 to 3, and
   (f) less than about 100 parts per million of catalyst, based on the total weight of the composition, said catalyst being a member selected from the group consisting of organometallic compounds, Lewis acids, protonic acids, and mixtures of these.

10. The composition as defined in claim 9 wherein said catalyst is a member selected from the group consisting of stannous octonoate, dibutyltin dilaurate, tetraisopropyl titanate, butyl titanate, and mixtures of these.

11. The composition as defined in claim 10 wherein said lactone is epsilon-caprolactone.

12. The composition as defined in claim 11 wherein said diacrylate is hydroxyethyl acrylate or methacrylate.

13. The composition as defined in claim 12 wheren said value of n is 2 to 3.

14. The composition as defined in claim 10 wherein an inhibitor is contained, said inhibitor being adapted to prevent polymerization of the hydroxyalkyl acrylate or methacrylate double bond.

15. The process of claim 6 wherein said catalyst is a member selected from the group consisting of organometallic compounds, Lewis acids, protonic acids, and mixtures of these.

16. The process of claim 15 wherein said catalyst is a member selected from the group consisting of stannous octonoate, dibutyltin dilaurate, tetraisopropyl titanate, butyl titanate, and mixtures of these.

17. The process of claim 6 wherein said reacting is performed at from about 120° C. to about 130° C.

18. The process of claim 6 wherein said reacting is performed from about 2 to about 20 hours.

19. The process of claim 18 wherein said reacting is performed from about 3 to about 11 hours.

* * * * *